(12) United States Patent
Lamesch et al.

(10) Patent No.: US 10,863,169 B2
(45) Date of Patent: Dec. 8, 2020

(54) CAMERA HEAD WITH INTEGRATED CALIBRATION TABLES

(71) Applicant: IEE International Electronics & Engineering S.A., Echternach (LU)

(72) Inventors: Laurent Lamesch, Reichlange (LU); Laurent Thiry, Ethe (BE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 15/127,222

(22) PCT Filed: Mar. 19, 2015

(86) PCT No.: PCT/EP2015/055768
§ 371 (c)(1),
(2) Date: Sep. 19, 2016

(87) PCT Pub. No.: WO2015/140246
PCT Pub. Date: Sep. 24, 2015

(65) Prior Publication Data
US 2018/0035106 A1    Feb. 1, 2018

(30) Foreign Application Priority Data

Mar. 19, 2014  (LU) .................................... 92 406

(51) Int. Cl.
*H04N 5/217*  (2011.01)
*H04N 17/00*  (2006.01)
(Continued)

(52) U.S. Cl.
CPC ....... *H04N 17/002* (2013.01); *G06K 9/00791* (2013.01); *H04N 5/2178* (2013.01); *H04N 5/2257* (2013.01)

(58) Field of Classification Search
CPC ................................................. G06K 9/00791
(Continued)

(56) References Cited

U.S. PATENT DOCUMENTS

| 5,047,861 | A | * | 9/1991 | Houchin | H04N 5/3572 348/247 |
| 2005/0110621 | A1 | * | 5/2005 | Hahn | B60R 1/00 340/435 |

(Continued)

FOREIGN PATENT DOCUMENTS

JP    2009063658 A  *  3/2009

OTHER PUBLICATIONS

International Search Report for International application No. PCT/EP2015/055768, dated May 28, 2016, 3 pages.

(Continued)

*Primary Examiner* — Amir Shahnami
(74) *Attorney, Agent, or Firm* — Reising Ethington P.C.

(57) ABSTRACT

A camera based driver assistance system or vehicle safety system having a camera head including at least one imager unit for recording image data and converting said image data into a digital image signal and a serializing unit for providing said digital image signal at an output of said camera head. The camera system further includes a main processor unit connected to the output of said camera head by means of a data link connection for receiving and processing said digital image signal from said camera head. The camera head includes at least one bloc containing calibration data for said imager and a digital control circuit, said bloc and/or said digital control circuit being operatively coupled to said serializing unit and configured in such a way that said calibration data are transferable to said serializing unit and (Continued)

subsequently transmittable to said main processor unit to be used in the processing of said digital signal from said camera head.

15 Claims, 1 Drawing Sheet

(51) Int. Cl.
*H04N 5/225* (2006.01)
*G06K 9/00* (2006.01)

(58) Field of Classification Search
USPC ........................................................ 348/148
See application file for complete search history.

(56) References Cited

U.S. PATENT DOCUMENTS

| | | | |
|---|---|---|---|
| 2007/0146707 A1* | 6/2007 | Matsumura | G01B 11/24 356/394 |
| 2009/0213250 A1* | 8/2009 | Alakarhu | G03B 7/00 348/243 |
| 2012/0127294 A1* | 5/2012 | Yamaguchi | H04N 5/361 348/73 |

OTHER PUBLICATIONS

Written Opinion for International application No. PCT/EP2015/055768, dated May 28, 2016, 5 pages.
Written Opinion (replaced) for International application No. PCT/EP2015/055768, dated May 28, 2016, 5 pages.
Results of earlier search for Luxembourg application No. LU 92 406, dated Sep. 24, 2014, 9 pages.

* cited by examiner

CAMERA HEAD WITH INTEGRATED CALIBRATION TABLES

TECHNICAL FIELD

The present invention generally relates to the technical field of digital imagers such as digital cameras and more specifically to a camera head for an automotive vision system, e.g. an automotive night vision system.

BACKGROUND ART

Digital cameras are increasingly used in automotive vehicles in driver assistance systems or in vehicle safety systems. Cameras are for instance used for monitoring the interior of the vehicle. The information obtained by these interior cameras may be used in order to gather information about seat occupancy, information to be used for seat belt reminder systems or airbag deployment systems. Interior cameras may also be used for driver's state monitoring in general and driver's vital signs monitoring in particular, a use which increases with the penetration of the advanced driver assistance systems, like emergency braking, lane keeping and e-call systems, which may be enhanced by taking into account inputs from the driver state and behavior. In addition, such an occupant monitoring device can fulfill a number of comfort functions as well.

In other applications, digital cameras are used for monitoring the vehicle surroundings in order to assist the driver when parking his vehicle or in order to recognize and localize objects, animals or people in the vicinity of a vehicle trajectory. One example of the latter systems is for instance an automotive night vision system, which assists the driver to detect obstacles and particularly people in the dark.

Camera systems, such as night vision camera systems, comprise a camera head, including the actual imager, and a main processor unit connected to the camera head by means of a data link connection. The camera head is arranged in the vehicle at an appropriate location such that the region of interest lies within the field of view of the imager. For night vision systems, the camera head may e.g. be arranged in the rearview mirror unit of the vehicle.

The camera head, e.g. the night vision camera head, must be calibrated individually at the end of the production line. Typically, two calibration tables are generated which each have the size of the image frame, one offset table and one gain table. These tables are specific to each physical imager. In order to keep logistic cost down, these calibration tables must be stored inside the camera head in a cost efficient way. Storage in the connected main processing unit is not permitted.

Solutions have been proposed, e.g. in document U.S. Pat. No. 7,590,305, in which imager imperfections are corrected inside the camera head and the corrected and calibrated image is produced at the output of the camera head. This has the advantage of having a camera head output which does not have to be corrected. On the other hand, such a solution requires a video processing unit inside of the camera head which substantially increases the cost of the camera head.

Technical Problem

It is an object of the present invention to provide an improved camera head with integrated calibration tables. The object is achieved by the invention as claimed in claim 1.

GENERAL DESCRIPTION OF THE INVENTION

A camera based automotive vision system, such as a driver assistance system or vehicle safety system, in accordance with the present invention comprises a camera head including at least one imager unit for recording image data and converting said image data into a digital image signal and a serializing unit for providing said digital image signal at an output of said camera head. The camera based automotive vision system further includes a main processor unit connected to the output of said camera head by means of a data link connection for receiving and processing said digital image signal from said camera head. According to the invention, the camera head comprises at least one bloc containing calibration data for said imager and a digital control circuit, such as a microcontroller, an FPGA or a PLD (programmable logic device) or a discrete digital logic. The bloc and/or the digital control circuit are operatively coupled to the serializing unit and configured in such a way that said calibration data are transferable to said serializing unit and subsequently transmittable to said main processor unit to be used in the processing of said digital signal from said camera head.

The present invention thus proposes to store the calibration data of the imager in the camera head and to enable the calibration data to be transferred to the main processing unit so that the calibration data may be used by the main processing unit for the processing of the image signal data. The main processing unit therefore may use the tables to correct the video or image data as received from the camera head. Moving the correction process from the camera head into the processing unit and using the already existing video link as a transfer link for the calibration data is a low cost solution to the problem of assigning specific calibration tables to a specific camera head.

In a preferred embodiment of the invention, said calibration data are transferable to said serializing unit under the control of said digital control circuit. The digital control circuit, i.e. a microcontroller, an FPGA or a PLD (programmable logic device) or a discrete digital logic, itself may be controlled by the serializing unit by requests of the main processing unit.

It will be appreciated that said calibration data may be transferred to said serializing unit, and subsequently transmittable to said main processor unit, in parallel with said digital image signal or alternatively sequentially in time with said digital image signal.

In a preferred embodiment of the invention, the said imager unit comprises an imager converting light information into an analog output signal and an at least one analog to digital converter for converting said analog output signal into a digital image signal, said analog to digital converter being operatively connected to an input of said serializing unit. It will be appreciated that the light information may be either visible light or infrared light.

In order to synchronize the video data to the output data of non-volatile bloc, the input clocks of analog to digital converter, serializing unit and non-volatile bloc and preferably digital controller are all derived from the same clock source. This means that said at least one analog to digital converter, said serializing unit and said bloc and/or said digital control circuit each include a clock input for applying a respective clock signal, and that said clock signals to be applied to the respective clock inputs of said at least one analog to digital converter, said serializing unit and said bloc and/or said digital control circuit are preferably derived from a single clock source.

It will be appreciated that it is not required that the clock frequencies of all these inputs are the same. It is for example possible to run the non-volatile memory at a clock frequency which is only half of the input clock frequency of the serializing unit and analog to digital converter, whereby each of the transferred calibration bits are duplicated, as two video data words are transferred while only one calibration bit is transferred. In other words it is not required that the different clock signals are identical but the clock signals may be multiples of each other respectively fractions of each other.

In an embodiment, in which the calibration data are transferred in parallel with the digital image signal to the serializing unit, the serializing unit comprises preferably at least two parallel inputs. The imager unit is then preferably operatively coupled to at least one of said at least two parallel inputs and said bloc and/or said digital control circuit is/are operatively coupled to another one of said at least two parallel inputs.

In the case that the serializing unit does not have enough data inputs, the output of the non-volatile bloc can still be routed into the serializing unit by means of a supplemental multiplexer. In such an embodiment, the camera head further comprises a multiplexer circuit, a first input of which is operatively coupled to an output of said imager unit, a second input of which is operatively coupled to said bloc and/or said digital control circuit and an output of which is operatively coupled to an input of said serializing unit.

It will be appreciated that for the different embodiments, a control interface of said multiplexer circuit and/or of said digital control circuit is operatively coupled to said serializing unit.

Furthermore, the calibration data may comprise calibration tables stored in said bloc, for instance two calibration tables, one of said calibration tables being an offset table and the other one of said calibration tables being a gain table.

In a possible embodiment, the bloc further comprises one or more data word selected from the group of an additional header word before the calibration tables, an end word after the calibration tables, and/or a checksum or CRC word after the end word. The one or more data word is then transferable together with said calibration tables to said serializing unit. By means of the header and end words and the method to calculate the checksum or CRC, the main processing unit is able to detect errors in the transmission, namely a delayed start of transmission of the calibration tables, missing bits, and bit errors.

BRIEF DESCRIPTION OF THE DRAWINGS

Preferred embodiments of the invention will now be described, by way of example, with reference to the accompanying drawings, which show.

DESCRIPTION OF PREFERRED EMBODIMENTS

A camera head includes an imager, an analog to digital converter converting the imager output into digital video data, a serializer and a serial nonvolatile memory containing calibration tables which are specific to the imager. A digital control circuit routes the output of the nonvolatile memory, either in parallel to or sequentially in time with the video data generated by the analog to digital converter to the serializer, thereby utilizing the bidirectional serial data link between the camera head and a main processing unit at the same time as video data link and calibration data link. The main processing module which connects to the camera head via the serial link uses the calibration tables to correct the received video data.

Figure 1:
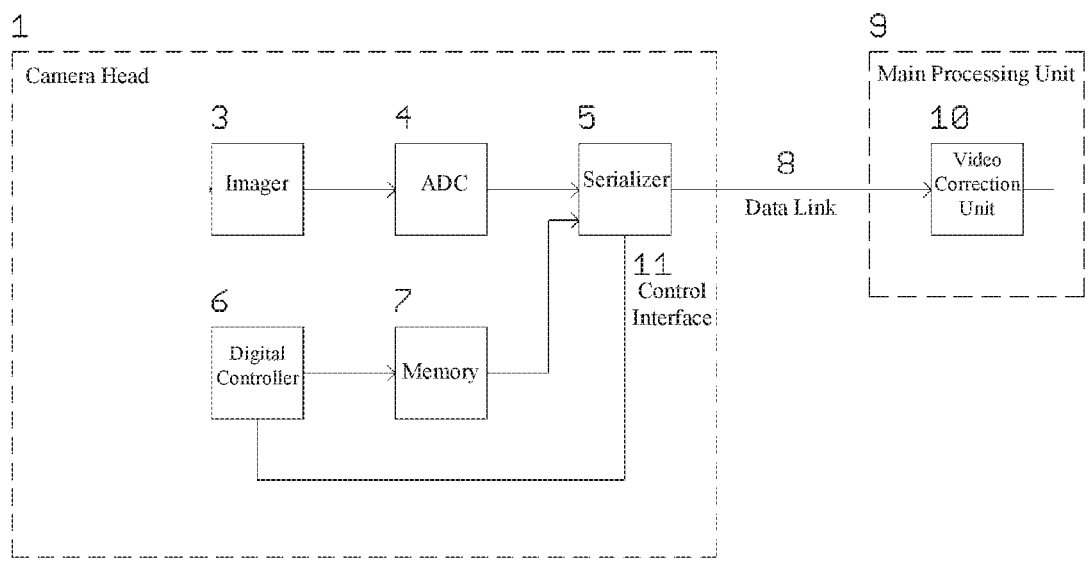
FIG. 1: a simplified circuit diagram of a first exemplary embodiment of a camera system in accordance with the teaching of the present invention.

Referring to FIG. 1, camera head 1 contains an imager 3 with an analog output signal, an analog to digital converter 4 which converts the analog output of imager 3 into a parallel digital data stream, a serializer 5 which converts the digital data stream at its input into a serial data stream. The serial data stream is transferred via the link 8 into the main processing unit 9, which contains a video correction unit 10.

For example, the analog to digital converter 4 converts the analog input signal with a rate of 10 Msamples per second, its output data width is 14 bits. Serializer 5 can for example be a 20 bit input and LVDS (low-voltage differential signaling) type serializer, for example a Texas Instruments LVDS type DS90UB903Q. The 14 output bits of analog to digital converter 4 are for example connected to input bits 0 to 13 of serializer 5.

A digital controller 6 initializes and controls the serial non-volatile memory 7. The serial output of non-volatile memory 7 is connected to one parallel data input of serializer 5. The control interface 11 of serializer 5 is connected to the control interface of digital controller 6.

For example, digital controller 6 can be an 8 bit microcontroller or an FPGA, the control interface of serializer 5 and digital controller 6 is an I2C interface, and serial non-volatile memory 7 is a SST25VF032B 32 Mbit SPI Serial Flash. The serial output of non-volatile memory 7 is for example connected to input bit 14 of serializer 5.

During the end of production line calibration of the camera head 1, the camera head 1 is connected with its bidirectional serial data link 8 to a production calibration instrument not shown here. The production calibration instrument generates the calibration tables during the calibration procedure. The production calibration instrument then writes the calibration tables via the serial data link 8, via the control interface 11 to the digital controller 6, which in turn writes the calibration tables into non-volatile memory 7.

During normal operation as shown in FIG. 1, the main processing unit 9 sends a request to the digital controller 6 via link 8 and control interface 11 to start the transfer of the stored calibration tables from the non-volatile memory to the main processing unit 9. Digital controller 6 initializes non-volatile memory 7 such that it sends the contents of its memory, namely the stored calibration tables, via its serial output to one of the parallel data inputs of serializer 5. As the parallel inputs of serializer 5 are all continuously read in at the same time and transferred via link 8 to the main processing unit 9, the main processing unit 9 is able to retrieve the video data and stored calibration data at the same time. In order to synchronize the video data to the output data of non-volatile memory 7, the input clocks of analog to digital converter 4, serializer 5 and non-volatile memory, and preferably digital controller 6, are all derived from the same clock source. It is not required that the clock frequencies of all these inputs are the same, it is for example possible to run the non-volatile memory at a clock frequency which is only half of the input clock frequency of the serializer and analog to digital converter, whereby each of the transferred calibration bits are duplicated, as two video data words are transferred while only one calibration bit is transferred.

In a further refinement, non-volatile memory 7 contains an additional header word before the calibration tables, an end word after the calibration tables, and a checksum or cyclic redundancy check (CRC) word after the end word. All these words are transferred together with the calibration tables, in the order as described above. As the header and end words and the method to calculate the checksum or CRC are known to the main processing unit 9, the main processing unit 9 is able to detect errors in the transmission, namely a delayed start of transmission of the calibration tables, missing bits, and bit errors. Additionally, a delayed transmission of the calibration tables can be corrected by main processing unit 9 by searching the position of the header word, and shifting the transferred data accordingly.

Figure 2:
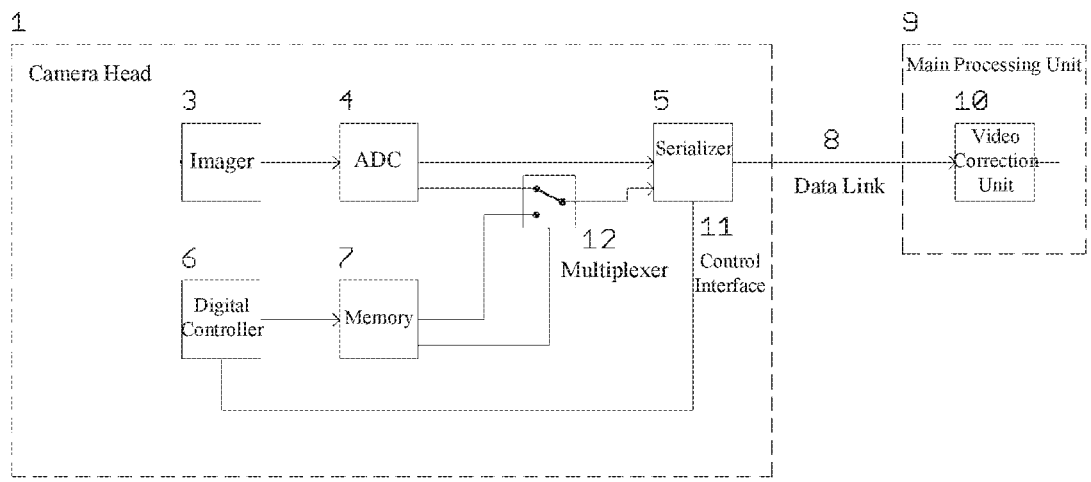
FIG. 2: a simplified circuit diagram of a second exemplary embodiment of a camera system in accordance with the teaching of the present invention.

FIG. 2 shows an alternative embodiment. Multiplexer 12 is added. For the case that there are not enough data inputs of the serializer 5, the output of the non-volatile memory 7 can still be routed into the serializer 5 by adding multiplexer 12. In normal operation, multiplexer 12 is switched to the state as shown in FIG. 2. All output bits of analog to digital converter 4 are routed to the inputs of serializer 5. When calibration tables must be transferred to the main processing unit 9, the digital control circuit 6 switches multiplexer 12 to its opposite position. Output of non-volatile memory 7 is then routed to one of the input bits of serializer 5, instead of an output bit of analog to digital converter 4.

The invention claimed is:

1. A camera based automotive vision system, such as a driver assistance system or vehicle safety system, comprising:
    a camera head comprising at least one imager unit for recording image data and converting said image data into a digital image signal and a serializing unit having at least two parallel inputs, and wherein said imager unit is operatively coupled to at least one of the at least two parallel inputs for providing said digital image signal at an output of said camera head, and
    a main processor unit connected to the output of said camera head by a data link connection for receiving and processing said digital image signal from said camera head,
    wherein said camera head comprises at least one bloc containing imager-specific calibration data generated during production of said imager and a digital control circuit, wherein said bloc, said digital control circuit, or both, are operatively coupled to another of the at least two parallel inputs of said serializing unit and, wherein said serializing unit is configured to convert said digital image signal and said calibration data received at the at least two parallel inputs into a serial data stream that enables transfer of said calibration data and said digital image signal to said main processor unit, wherein said calibration data is used in the processing of said digital signal from said camera head.

2. A camera based automotive vision system according to claim 1, wherein said calibration data are transferable to said serializing unit under the control of said digital control circuit.

3. A camera based automotive vision system according to claim 1, wherein said calibration data are transferable to said serializing unit, and subsequently transmittable to said main processor unit, in parallel with said digital image signal.

4. A camera based automotive vision system according to claim 1, wherein said calibration data are transferable to said serializing unit, and subsequently transmittable to said main processor unit, sequentially with said digital image signal.

5. A camera based automotive vision system according to claim 1, wherein said imager unit comprises an imager converting light information into an analog output signal and an at least one analog to digital converter for converting said analog output signal into a digital image signal, said analog to digital converter being operatively connected to an input of said serializing unit.

6. A camera based automotive vision system according to claim 5, wherein said at least one analog to digital converter, said serializing unit, and at least one of said bloc and said digital control circuit, each include a clock input for applying a respective clock signal, and wherein said clock signals to be applied to the respective clock inputs of said at least one analog to digital converter, said serializing unit, and at least one of said bloc and said digital control circuit, are derived from a single clock source.

7. A camera based automotive vision system according to claim 1, wherein said camera head further comprises a multiplexer circuit, a first input of which is operatively coupled to an output of said imager unit, a second input of which is operatively coupled to at least one of said bloc and said digital control circuit, and an output of which is operatively coupled to an input of said serializing unit.

8. A camera based automotive vision system according to claim 7, wherein a control interface of said multiplexer circuit is operatively coupled to said serializing unit.

9. A camera based automotive vision system according to claim 1, wherein a control interface of said digital control circuit is operatively coupled to said serializing unit.

10. A camera based automotive vision system according to claim 1, wherein said calibration data comprise calibration tables stored in said bloc.

11. A camera based automotive vision system according to claim 1, wherein said calibration data comprise two calibration tables, one of said calibration tables being an offset table and the other one of said calibration tables being a gain table.

12. A camera based automotive vision system according to claim 10, wherein said bloc comprises one or more data words that include at least one of: an additional header word before the calibration tables, an end word after the calibration tables, and a checksum or a cyclic redundancy check (CRC) word after the end word,
    and wherein said one or more data word is transferable together with said calibration tables to said serializing unit.

13. A night vision system for an automotive vehicle comprising a camera based automotive vision system according to claim 1.

14. A camera based automotive vision system according to claim 1, wherein said digital control circuit is associated to said bloc and configured for controlling said bloc and wherein said calibration data are transferable to said serializing unit under the control of said digital control circuit.

15. A camera based automotive vision system according to claim 1, wherein said serializing unit includes at least two parallel inputs enabling concurrent transmission of said calibration data and said digital image to said main processor.

* * * * *